May 23, 1961   W. P. VAN DEN BLINK ET AL   2,985,744
STUD WELDING
Filed July 18, 1958
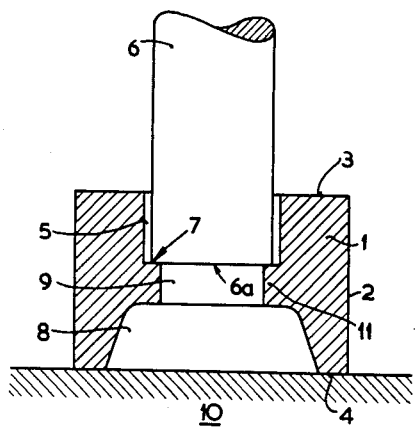
INVENTORS
WILLEM P. VAN DEN BLINK
EMILE M. J. BERTIN
BY
AGENT United States Patent Office 2,985,744
Patented May 23, 1961

2,985,744
STUD WELDING
Willem Pieter van den Blink and Emile Marie Joseph Bertin, Utrecht, Netherlands, assignors to North American Philips Company, Inc., New York, N.Y., a corporation of Delaware
Filed July 18, 1958, Ser. No. 749,466
Claims priority, application Netherlands Aug. 7, 1957
6 Claims. (Cl. 219—99)

Our invention relates to stud welding and more particularly to electrically-conductive slag-forming bodies for use therein.

The term "stud welding" as used herein is to be understood to mean the securing of the end of a stud-like metallic body to a metallic surface by maintaining an arc between the parts to be joined for some time and subsequently bringing the two parts into contact with each other. This method frequently utilizes a slag-forming body which is placed between the parts to be joined to hold them apart a distance corresponding to the desired length of the arc, and to prevent the two parts from coming into contact with each other until the slag-forming body has been deformed by heat developed therein. By suitably selecting the composition and dimension of the slag-forming body, it may be ensured that, when using pressure upon one of the parts to be joined, the welding process is accomplished automatically while the duration necessary for deforming the slag-forming body by the action of the heat of the arc exactly corresponds to the desired duration of burning of the arc. In order to obtain this accuracy in a reproducible manner, the shape and the dimensions of the slag-forming body are chosen so that it does not succumb to a pressure exerted thereon until an accurately predetermined part thereof has been softened by the arc.

For the above purpose and as shown, for example in U.S. Patent 2,509,999, the slag-forming body may be provided with a continuous cavity of a shape such that the extremity of a stud introduced into it can penetrate this cavity only over a determined distance and that the extremity of the stud rests upon the surface of a supporting portion of the slag-forming body and is pressed against the metallic surface only after this portion has softened. To prevent a weld of irregular shape in which slag is occluded, the slag-forming body is sometimes given a shape such that opposite the cavity which the stud can penetrate over a determined distance, there is provided a cavity which has an opening larger than the cross-section of the stud and a volume larger than the volume of that portion of the stud, which penetrates the body after the local softening of the supporting portion. With such a slag-forming body the softened material of the supporting portion escapes into the cavity when the stud moves.

In order to avoid cracking of the body as a result of the heat of the arc, which is frequently followed by crumbling off and deformation due to stress produced therein, resulting in a reduction in the size of the part of the body to be softened by the arc and hence also the time during which this body resists the pressure exerted upon it being varied, use may be made, for example, of a slag-forming body provided with a reinforcing or strengthening member such that, even after the slag-forming body has cracked, it remains sufficiently coherent during the burning of the arc until a predetermined portion thereof has softened. One preferred form of this strengthening is, for example, a small cardboard strip, part of its width supporting the body and another part constituting the cavity which can be penetrated by the extremity of the stud, as shown in U.S. Patent 2,829,234.

In order that in this method the arc is ignited, the body may contain powdery metal in a quantity bringing about a conductivity which is sufficient for the ignition of the arc. However, this conductivity may alternatively be brought about by the presence of reduced $TiO_2$, so that the slag-forming body fulfills the function of a semi-conductor. In addition to reducing metal and titanium oxide, the slag-forming body usually contains other substances, such as suitable silicates. The amount of titanium oxide is usually at least 50% by weight. A suitable body is obtained, for example, by manufacturing a mixture consisting of:

| | Percent by weight |
|---|---|
| Rutile | 60 |
| Bentonite | 27 |
| Manganese silicon | 13 |

It has been suggested to heat the electrically conductive slag-forming body at a temperature of 900°–1100° C. in an inert gas, for example $N_2$, during which process the constituents sinter together to form a solid mass, gases are expelled, and the oxygen content of the titanium oxide is reduced to the desired extent.

An object of the inveniton is to provide means to ensure that the electric arc has little or no influence upon the outer shape and the coherence of the body so that without external strengthening the body resists a pressure exerted upon it during stud welding in a reproducible manner for a sufficiently long time.

In accordance with the invention the slag-forming body, which has a stud-supporting portion adapted to be softened, contains as essential ingredients titanium dioxide, and in the calculated oxidic composition, about 0.1 to 0.5 part of $ZrO_2$ and about 0.25 to 0.7 part of $SiO_2$ to one part by weight of $TiO_2$.

The $ZrO_2$ may be added if desired in the form of zirconium orthosilicate ($ZrSiO_4$), which is cheaper than the addition of pure $ZrO_2$.

The invention affords the following advantages:

(a) It is no longer necessary to provide the slag-forming body with a cardboard reinforcement or the like.

(b) The rigidity at high temperature of the part of the lower edge of the body which does not soften is increased so that the body is better capable of adding to a sufficient shaping of the weld by keeping together the excess of molten welding metal so as to constitute a reasonably regular ring or collar round the welded extremity of the stud.

(c) The body is better capable of preventing molten welding metal from flowing away by the action of gravity in positions other than horizontal such, for example, as in vertical welding or overhead welding.

The slag-forming body according to the invention has such a low coefficient of expansion that difficulties due to the tension produced therein are reduced, and has such a low thermal conductivity that undesirable softening of parts of the body other than those parts which are intended to soften is prevented.

The melting point is increased by the increase in $SiO_2$-content and the addition of $ZrO_2$ at the expense of the $TiO_2$-content. If, as a result thereof, an undue portion of the end of the stud would melt off prior to softening of the body, the increase in melting point may be neutralized by the addition of alkaline oxides or fluor compounds, for example $Na_2O$ or $CaF_2$, to the calculated oxidic composition. It is also possible to vary the dimensions of the body so that the part to be softened becomes smaller, with the result that the arc keeps burning for a shorter period. Owing to the increase in SiO₂-content, it appears to be more difficult to re-ignite the arc, which is manifest from a more or less crackling sound and a tendency to spluttering during the burning of the arc. In order to avoid this effect, the calculated oxidic composition may include a certain percentage of alkaline oxides, for example $Na_2O$.

In order to obtain a sufficient degree of coherence during sintering, the calculated oxidic composition may have added to it a certain percentage of alkaline oxides, fluor compounds or boron oxide, for example $Na_2O$, $CaF_2$, $B_2O_3$.

For compensating the decrease in conductivity as a result of the lower content of titanium oxide, it is possible, in addition to the introduction of powdery metal, to add also metal silicides or titanides, silico-titanium or fluor compound, for example $Fe_2Si$, $Fe_2Ti$, $SiTi$ or $CaF_2$.

Proper strengthening of the body is obtained in an embodiment according to the invention by adding to one part of $TiO_2$ in the calculated oxidic composition 0.25–0.7 part of $SiO_2$ and 0.1–0.5 part of $ZrO_2$. The ceramic properties such, for example, as the mouldability and strength of the non-sintered body, the hardness, the degree of glazing and the resistivity to corrosion of the sintered body are improved in one embodiment of the invention by adding in the oxidic composition to one part of $TiO_2$ 0.1–0.25 part of $Al_2O_3$ in some suitable form.

In one embodiment of the invention, the degree of reduction of the $TiO_2$ is increased by adding in the calculated oxidic composition to one part of $TiO_2$ at most 0.1 part of a fluor compound, such as $CaF_2$, and at most 0.3 part of metal silicides, metal titanides or silico-titanium.

The expression "calculated oxidic composition" relates to a manner of expression which is common practice inter alia in the ceramic industry, to indicate the gross composition of a sintered final product independently of the raw materials used, the substances occurring as compounds of oxides being specified by statement of their constitutive single oxides. Thus, for example, sintering kaoline $$(Al_2O_3 \cdot 2SiO_2 \cdot 4H_2O)$$

results in a calculated oxidic composition of 54.1% of $SiO_2$ and 45.9% of $Al_2O_3$.

Substances other than oxides are mentioned separately.

The bodies according to the invention are preferably manufactured by sintering a non-sintered body at a temperature of from 1000° C. to 1200° C. in a reducing atmosphere.

It is common practice to sinter between 900° C. and 1100° C.

In the method according to the invention, the reducing atmosphere is preferably obtained by a mixture of nitrogen and hydrogen.

Two very suitable compositions of bodies according to the invention are, for example:

|  | Percent by weight | |
| --- | --- | --- |
| $TiO_2$ | 43.8 | 57.2 |
| $SiO_2$ | 25.8 | 18.3 |
| $Zr_2O_2$ | 12.0 | 11.3 |
| $Al_2O_3$ | 6.5 | 3.4 |
| $Na_2O$ | 2.4 | 1.1 |
| $Mn_2Si$ | 6.8 | 7.0 |
| $Fe_2Si$ | 2.7 |  |
| $B_2O_3$ |  | 0.3 |
| $CaF_2$ |  | 1.4 |
|  | 100.0 | 100.0 |

In the single figure of the accompanying drawing an example is shown of an electrically conductive, slag-forming body according to the invention.

The body 1 has an outer cylindrical surface 2 and planar end surfaces 3 and 4. The body is provided with a cavity 5, in which a metal stud 6 can be inserted. The stud 6 comes to rest on a surface 7 of a stud-supporting portion 11.

Cavity 5 is connected by means of a passageway 9 to a second cavity 8 whose diameter is greater than the diameter of stud 6.

The body 1 may be manufactured by moulding in dies on a suitable press, and because of the composition of the material requires no reinforcing or strengthening members.

As shown the body 1 is positioned on a work piece 10. The stud 6 is inserted in the cavity 5 until it abuts the surface 7. An arc is struck between the end surface 6a of stud 6 and the work piece 10 whereupon portion 11 of the body is first softened by the heat of the arc and then the stud 6 is urged towards the work piece 10 where meanwhile a pool of molten metal is formed into which the hot end of the stud is inserted and fastened after solidification of the molten metal. By that time body 1 has completely collapsed, but has already done its work as a slag former, and as means for keeping the molten metal together.

The body 1 is made from material as described above.

What is claimed is:

1. A body for temporarily spacing a metallic member from a second metallic member to be secured together by stud welding, comprising a member of electrically-conductive slag-forming material containing as essential ingredients titanium dioxide, and in the calculated oxidic composition about 0.1 to 0.5 part of $ZrO_2$ and about 0.25 to 0.7 part of $SiO_2$ to one part by weight of the $TiO_2$, and means including a portion of said member to support said first metallic member until the portion is softened.

2. A body for temporarily spacing a metallic member from a second metallic member to be secured together by stud welding, comprising a member of electrically-conductive slag-forming material containing as essential ingredients titanium dioxide, and in the calculated oxidic composition about 0.1 to 0.5 part of $ZrO_2$ and about 0.25 to 0.7 part of $SiO_2$ to one part by weight of the $TiO_2$, said slag-forming member being provided with a bore adapted to receive said first member and a supporting portion adapted to support said first member until the portion is softened.

3. A body for temporarily spacing a metallic member from a second metallic member to be secured together by stud welding, comprising a member of electrically-conductive slag-forming material containing as essential ingredients titanium dioxide, and in the calculated oxidic composition about 0.1 to 0.5 part of $ZrO_2$, about 0.25 to 0.7 part of $SiO_2$ and about 0.1 to 0.25 part of $Al_2O_3$ to one part by weight of the $TiO_2$, and means including a portion of said member to support said first metallic member until the portion is softened.

4. A body for temporarily spacing a metallic member from a second metallic member to be secured together by stud welding, comprising a member of electrically-conductive slag-forming material containing as essential ingredients titanium dioxide, and in the calculated oxidic composition to one part by weight of the $TiO_2$ about 0.1 to 0.5 part of $ZrO_2$, about 0.25 to 0.7 part of $SiO_2$, up to about 0.15 part of $R_2O$ in which R represents an alkaline metal, up to about 0.1 part of a fluor compound and up to 0.05 part of $B_2O_3$, and means including a portion of said member to support said first metallic member until the portion is softened.

5. A body for temporarily spacing a metallic member from a second metallic member to be secured together by stud welding, comprising a member of electrically-conductive slag-forming material containing as essential ingredients titanium dioxide, and in the calculated oxidic composition to one part by weight of the $TiO_2$, about 0.1 to 0.5 part of $ZrO_2$, about 0.25 to 0.7 part of $SiO_2$, up to about 0.15 part of $Na_2O$, up to about 0.1 part of $CaF_2$ and up to about 0.05 part of $B_2O_3$ in the form of borax, and means including a portion of said member to support said first metallic member until the portion is softened.

6. A body for temporarily spacing a metallic member from a second metallic member to be secured together by stud welding, comprising a member of electrically-conductive slag-forming material containing as essential ingredients titanium dioxide, and in the calculated oxidic composition to one part by weight of the $TiO_2$, about 0.1 to 0.5 part of $ZrO_2$, about 0.25 to 0.7 part of $SiO_2$, and up to about 0.3 part of at least one of the compounds selected from the group consisting of metal silicides, metal titanides and silico-titanium, and means including a portion of said member to support said first metallic member until the portion is softened.

References Cited in the file of this patent

UNITED STATES PATENTS

| | | |
|---|---|---|
| 2,164,775 | Miller | July 4, 1939 |
| 2,510,000 | Willigen et al. | May 30, 1950 |
| 2,833,914 | Blink et al. | May 6, 1958 |